(12) United States Patent
Lunde et al.

(10) Patent No.: US 8,264,519 B2
(45) Date of Patent: Sep. 11, 2012

(54) TELEPRESENCE SYSTEM, METHOD AND COMPUTER PROGRAM PRODUCT

(75) Inventors: Finn Helge Lunde, Kirkenes (NO);
Einar Andreas Hustadnes Hagen, Oslo (NO); Fredrik Eric Magnus Oledal, Oslo (NO); Bjorn Winsvold, Tranby (NO); Jon Auden Reiersen Nordal, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 1213 days.

(21) Appl. No.: 12/050,004

(22) Filed: Mar. 17, 2008

(65) Prior Publication Data

US 2008/0246834 A1 Oct. 9, 2008

Related U.S. Application Data

(60) Provisional application No. 60/895,331, filed on Mar. 16, 2007.

(30) Foreign Application Priority Data

Mar. 16, 2007 (NO) .................................. 20071401

(51) Int. Cl.
*H04N 7/14* (2006.01)
(52) U.S. Cl. .................................. 348/14.09; 348/14.08

(58) Field of Classification Search .... 348/14.01–14.16, 348/E7.077; 370/260, 261; 715/753, 755, 715/751
See application file for complete search history.

(56) References Cited

U.S. PATENT DOCUMENTS

| 6,608,644 B1 | 8/2003 | Kondo et al. |
| 6,624,841 B1 * | 9/2003 | Jullien et al. .................. 348/14.1 |
| 2003/0058334 A1 | 3/2003 | Boyden et al. |
| 2005/0024484 A1 | 2/2005 | Leonard et al. |
| 2007/0279483 A1 * | 12/2007 | Beers et al. ................ 348/14.08 |

FOREIGN PATENT DOCUMENTS

| JP | 11-234640 | 8/1999 |
| WO | WO 99/12351 | 3/1999 |
| WO | WO 03/101101 A1 | 12/2003 |

* cited by examiner

*Primary Examiner* — Curtis Kuntz
*Assistant Examiner* — Sunita Joshi
(74) *Attorney, Agent, or Firm* — Oblon, Spivak, McClelland, Maier & Neustadt, L.L.P.

(57) ABSTRACT

A video conferencing system provides realistic presence of participants in a videoconference by way of standards-based communication. The system includes three large displays, and at least one slave codec and one camera for each display. In addition, there is an extra codec installed which is the master codec. The master codec is able to establish a conference by instructing the slave codecs at its own site and at the other participating sites to set up point-to-point connections with other slave codecs at different participation sites in a pattern providing an optimal feeling of natural communication so that when a user A talk to user B at another site, user B will experience that the user A turns to him.

29 Claims, 12 Drawing Sheets

TELEPRESENCE SYSTEM, METHOD AND COMPUTER PROGRAM PRODUCT

CROSS-REFERENCE TO RELATED APPLICATIONS

The present application claims priority to U.S. provisional application filed Mar. 16, 2007 and having application Ser. No. 60/895,331, and contains related subject matter to Norwegian patent application No. 20071401, filed on Mar. 16, 2007, the entire contents of both of which being incorporated herein by reference.

BACKGROUND OF THE INVENTION

1. Field of the Invention

The present invention relates to video conferencing systems, methods, and computer program product having telepresence features.

2. Description of the Related Art

Conventional videoconferencing systems include a number of end-points that communicate real-time video, audio and/or data (often referred to as "duo video") streams over and between various networks such as WAN, LAN and circuit switched networks.

A number of videoconference systems residing at different sites may participate in a same conference, most often, through one or more MCU's (Multipoint Control Unit) performing, among other things, switching and mixing functions to allow the audiovisual terminals to intercommunicate properly. The MCU also allows for aggregate presentation on one display of several end users located at different end-points.

However, representing moving pictures requires bulk information, as digital video typically is described by representing each pixel in a picture with 8 bits (1 Byte). Such uncompressed video data results in large bit volumes, and can not practically be transferred over conventional communication networks and transmission lines in real time due to limited bandwidth.

Real time video transmission often requires a large extent of data compression, which may compromise with picture quality. The compression of multimedia data to be transmitted, as well as the decompression of the multimedia data to be received, takes place in a processor unit conventionally referred to as a "codec" (coder/decoder).

As videoconferencing involves various resources and equipment simultaneously interoperating at different places with varying capabilities, there is also a need for the possibility to manage the resources involved both for scheduled and ad hoc videoconferences through a video conference manager tool.

Video conferencing systems presently provide communication between at least two locations for allowing a video conference among participants situated at each station. Conventionally, the video conferencing arrangements are provided with one or more cameras. The outputs of those cameras are transmitted along with audio signals to a corresponding plurality of displays at a second location such that the participants at the first location are perceived to be present, or face-to-face, with participants at the second location.

Further, the images captured by the plurality of cameras must be arranged and displayed so that they generate a non-overlapping and/or contiguous field of view, so-called "continuous presence". Continuous presence is a mixed picture created from far-end sites in an MCU. For example, in case of a videoconference of five participants, each site will receive and display a picture divided into four quadrants with the picture components captured from each of the other sites inserted in the respective quadrants. Thus, in continuous presence, the area of the video screen gets further sub-divided as more participants are added to the conference. As such, the amount of screen area devoted to a particular participant becomes incrementally smaller as the number of participants increases.

Continuous presence, or several displays with only one camera, prevents the feeling of eye-contact among participants in video conferencing systems. Typically, a camera is placed somewhere above the display at which a participant is observing a display of the participant from the remote station. As recognized by the present inventors, the camera captures the participant at an angle above and on the side of the participant's viewing level or head. Thus, when an image of that participant is displayed at the remote station, it appears as if the participant is looking down or to the left or right. Previous solutions to this problem have required complex optical systems and methods using, for example, a plurality of lenses and mirrors. The solutions have usually been designed for use when the camera is capturing an image of a single participant, and they fall short when simultaneously capturing images of multiple participants.

In addition to the lack of sufficient eye-contact, there are also other limitations in conventional videoconferencing limiting the feeling of being in the same room. Continuous presence and small displays also limits the size of the displayed participants. Low capturing and display resolution and highly compressed data also contribute to a reduction of the experience of presence. Some solutions have tried to improve this by introducing so-called "telepresence systems" requiring dedicated high bandwidth communication lines. However, these solutions are not well suited to be connected to a conventional LAN or WLAN, and are not interoperable with conventional videoconferencing systems.

The eye-contact issue, and the feeling of participants from different sites being present in the same room is not fully resolved, as conventional systems capture the same picture and send the same to all the sites making the movements of the participants look unnatural when they turn to a certain display to talk to the participants displayed therein. Furthermore, with these telepresence systems, there is no conventional mechanism for interconnecting different telepresence sites that are located on different networks. Moreover, firewall traversal limits the ability to seamlessly establish connections between different telepresence sites. Thus conventional telepresence systems have been restricted to dedicated, high-bandwidth communication lines. Furthermore, conventional "telepresence" systems end up being stand-alone systems that are not well integrated with other computer resources and video conference resources within a particular company's facilities. Users of these telepresence systems are handicapped by having relatively limited amount of flexibility in adding other non-telepresence systems endpoints, and establishing calls between telepresence endpoints and other non-telepresence endpoints.

SUMMARY OF THE INVENTION

One aspect of the present invention is to address and resolve the above limitations with conventional systems, methods and computer program products.

In a first aspect, the present invention includes a video conference arrangement adapted to communicate with other corresponding video conference arrangements, terminals and endpoints, the video conference arrangement including one or more displays, a number of video capturing devices and a number of transceivers, wherein each of the one or more displays and the number of video capturing devices are associated with a respective one of the transceivers, wherein a display and a video capturing device associated with a common transceiver have substantially overlapping fields of view.

In a second aspect, the present invention describes a communication system for facilitating a conference between telepresence terminals providing life-sized video, wherein the terminals include transceivers, displays and video capturing devices, and wherein pairs of a display and a video capturing device having substantially overlapping fields of view are respectively associated with the transceivers, the telepresence terminals are connected by more than one separate point-to-point connections between separate transceivers of each of the telepresence terminals.

In a third aspect, the present invention provides a mechanism by which one telepresence system can initiate a telepresence session with a second telepresence system over a single or hybrid communication network that includes non-dedicated telecommunication lines. The establishment of the telepresence communication connection may be done with the initiation of a single call even though multiple codecs are involved in the communication.

BRIEF DESCRIPTION OF THE DRAWINGS

In order to make the invention more readily understandable, the discussion that follows will refer to the accompanying drawings.

DETAILED DESCRIPTION OF THE PREFERRED EMBODIMENTS

In the following, the present invention will be discussed by describing a preferred embodiment, and by referring to the accompanying drawings. However, people skilled in the art will realize other applications and modifications within the scope of the invention as defined in the appended claims.

Figure 1:
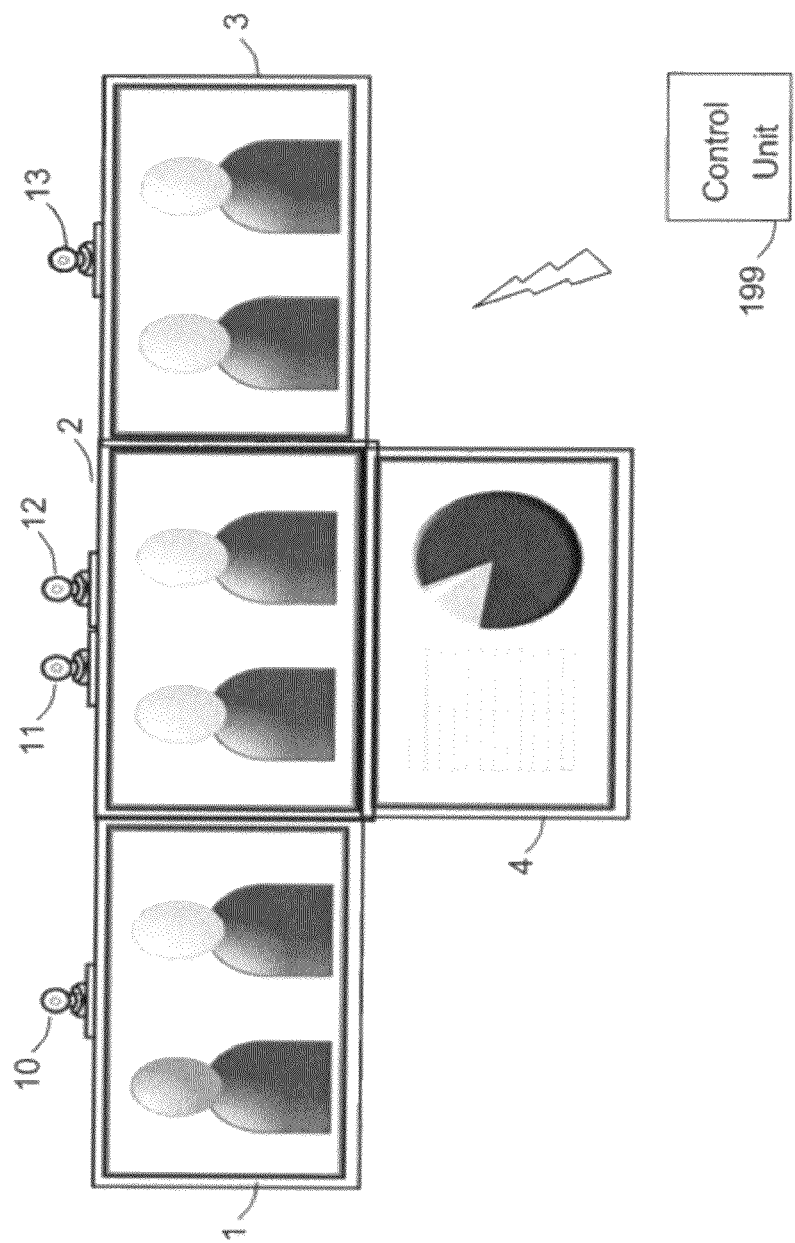
FIG. 1 is an example illustration of an endpoint telepresence assembly according to the present invention.

FIG. 1 shows the monitor and camera arrangement for a novel system for providing realistic presence of participants in a videoconference by way of standards-based communication. An endpoint compliant with this system is disclosed in FIG. 1, at least one codec (FIG. 2b) and one camera (10-13) are associated with each display. The displays 1-3 are preferably large-scaled flat screens placed side by side with the cameras respectively placed on top of the displays. As recognized by the present inventors, the distance between the left edge of display 1 and the right edge of display 3 can be a fairly far distance such as 10 feet or more. Consequently, as recognized by the present inventors, when a participant is looking toward remote participants displayed in the display 1, the user's head will be turned towards those users. As such, if one of the cameras 11, 12 or 13 were to capture the image of the user, that image would appear as though the users head is turned towards a different direction. In contrast, an image captured by camera 10 would give the appearance to the participants displayed in display 1 that that participant is looking at them. Therefore, the distribution of the cameras 10-13 is preferable distributed across the three displays 1, 2 and 3 as shown. This effect will give the "turn-to" feel towards participants at remote sites. This "turn-to" perception, gives the impression to the remote participants that the user is either looking towards them when communicating with them or turned to one of the other remote participants when the user is speaking with them directly.

There is also preferably an additional display 4 placed below the other displays 1-3 being reserved for data input, such as presentations and shared applications (such as computer graphics) or for communicating with regular (e.g., H.323) videoconferencing endpoints usually having only one camera and capable of displaying several sites in the same display.

There is a control unit 199, and/or an extra codec, such as a TANDBERG MXP6000 codec referred to as a "master codec", installed at telepresence endpoint according to the present invention. The control unit 199 has a user interface, e.g. with a pressure sensitive screen, making the user able to initiate calls in addition to all other I/O functions and adjusting all settings that the system is capable of providing. The control unit could also be able to receive and execute commands from a conference manager tool, such as setting up scheduled conferences etc. The control unit is in turn connected to the other parts of the endpoint through the master codec, which also could be the only codec registered in a conference manager making the other codecs as hidden slaves.

A telepresence compliant endpoint as described above will from now on be described as a telepresence system.

One aspect of "telepresence" is that, generally, the display size of an individual at the remote site is generally life size. As such, the division of a particular screen in the telepresence system does not reduce the size of the display of a person at a remote endpoint. Moreover, a six-foot person would be displayed having generally the same size as if seen in real life. This is in contrast to an MCU-based video conference system, where when additional parties are included in the telepresence system, the screen is further divided and the size of the participant is displayed in a smaller area. The addition of a non-telepresence participant in the system shown in FIG. 1 would be displayed in display 4 and a proportional amount of the screen area of display 4 would be adjusted according to the number of simultaneous participants that are simultaneously displayed on the display 4.

According to the present invention, a conference between telepresence systems is arranged by setting up site-to-site connections between respective codecs of the endpoints, even if the conference is a multi-site conference. Which codecs in which endpoints (because there are multiple endpoints as will be discussed) to connect to each other, are selected to optimize the feeling of presence for the participants in the conference. As an example, when the codec associated with the right camera and the right screen of site A in a conference is directly connected in a video conference link to the codec associated with the left camera and the left screen of site B, the participants of site A will experience that the participants of site B turn to them when the participants of site B look at the left screen where the participants of site A are displayed. Examples on how this will effect the selection of connections paths in different conference constellations are discussed further below.

According to one aspect of the present invention, when a conference is established, the one telepresence system initiating the conference is the master site. The master site controls the other telepresence systems in the conference keeping track of the status, identifying addresses of codecs, controlling the establishment of the conference, and rearranging the communication links when a telepresence systems joins or leaves during the conference.

This initial connection process will be discussed in more detail with regard to FIG. 7. A particular advantage with the present system is that it enables a codec at one telepresence system (caller) to initiate a telepresence conference with a remote telepresence system (callee) over different networks, and traversing different firewalls, all done with a single call. In the present example, where the network connections are part of an IP network, the master codec sends a stream of IP packets to the master codec of the callee. In one example, the IP packet may include a TPX message, indicating that the nature of the call is a telepresence call and informs the callee of the addresses of the respective codecs at the calling site. Likewise, the response from the callee's master codec may optionally begin communications directly with the corresponding codecs at the calling site, or may also report the addresses of the codecs at the callee's site so that the calling master codec will know what resources are available at the callee's site.

When a conference is to be established, e.g. on a request from the control unit or from a conference manager, the master site starts transmitting instructions to the other participating telepresence systems on how to set up connections between them.

The instructions are sent to the master codecs, which in turn relay the instructions to the codecs in question. The instruction, as a minimum identifies the caller codecs and the respective callee codecs for each site. The master codecs at the slave sites, other than the site having the master codec, should also be able to respond to the instructions from the master codec of the master site, e.g. informing that the connection was successful, and also notifying when a connection has gone down or when a site is leaving the conference. In this way, the master codec of the master site always keeps track of the status of the conference and the different connections, then being able to re-establish or rearrange the connections if necessary.

The instructions, consistent with standards-based communications, are incorporated in an open field in the message flow specifying the control protocol of establishing video conference call, such as ITU H.241, H.242 or H.243. As previously mentioned, the telepresence call may be identified as such by including a TPX message in the IP packet stream. By having the TPX messages part of the IP stream, allows for the calling telepresence system to exchange parameters such as addresses of codec for coordination between the different telepresence sites. Also, because the control protocol is established with the standards-based communications, the IP packet stream may traverse respective firewalls at both the caller's site and the callee's site. As such, it is possible to establish a telepresence conference over different networks, using a single call.

In the following, a number of different modes of operation and constellation of the system of the present invention will be described.

Figure 2A:
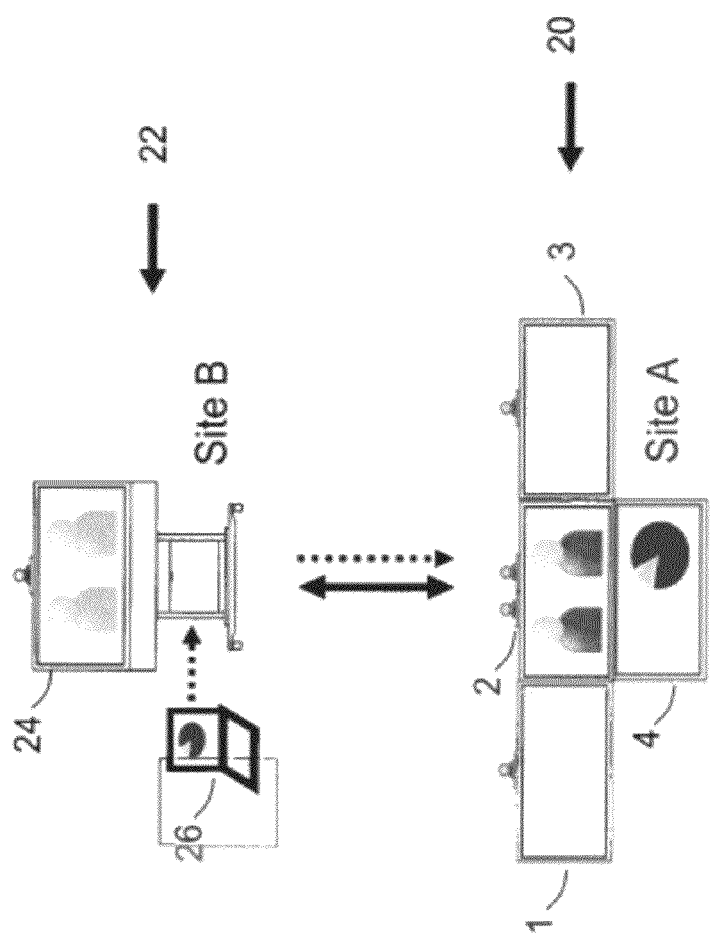
FIGS. 2a and 2b are illustrations of a connection mode between a telepresence system and a conventional video conference endpoint according to the present invention.

A first mode between a telepresence site (site A, 20) and a conventional videoconferencing site (site B, 22) is depicted in FIG. 2a. When the telepresence system is used as a stand alone videoconferencing system, the central screen 2 is used for displaying remote participants with the lower screen 4 operating as the duo video display. On connection to a remote site 22 or sites, the telepresence system 20 acts and responds as a normal dual display videoconferencing unit. At remote site B, 22, the screen 24 shows the participants on the screen, but then data included on a computer 26, is transmitted over the communication network for display on the duo video display 4.

The present inventors recognized that by including the duo video display 4 at a location beneath the screen in which the participants are being viewed, is most conducive to maintaining a natural telepresence condition and provides a sense of continued reality in communicating with the participants while easily viewing the graphics in the duo display 4 at an angle beneath the participants.

Figure 2B:
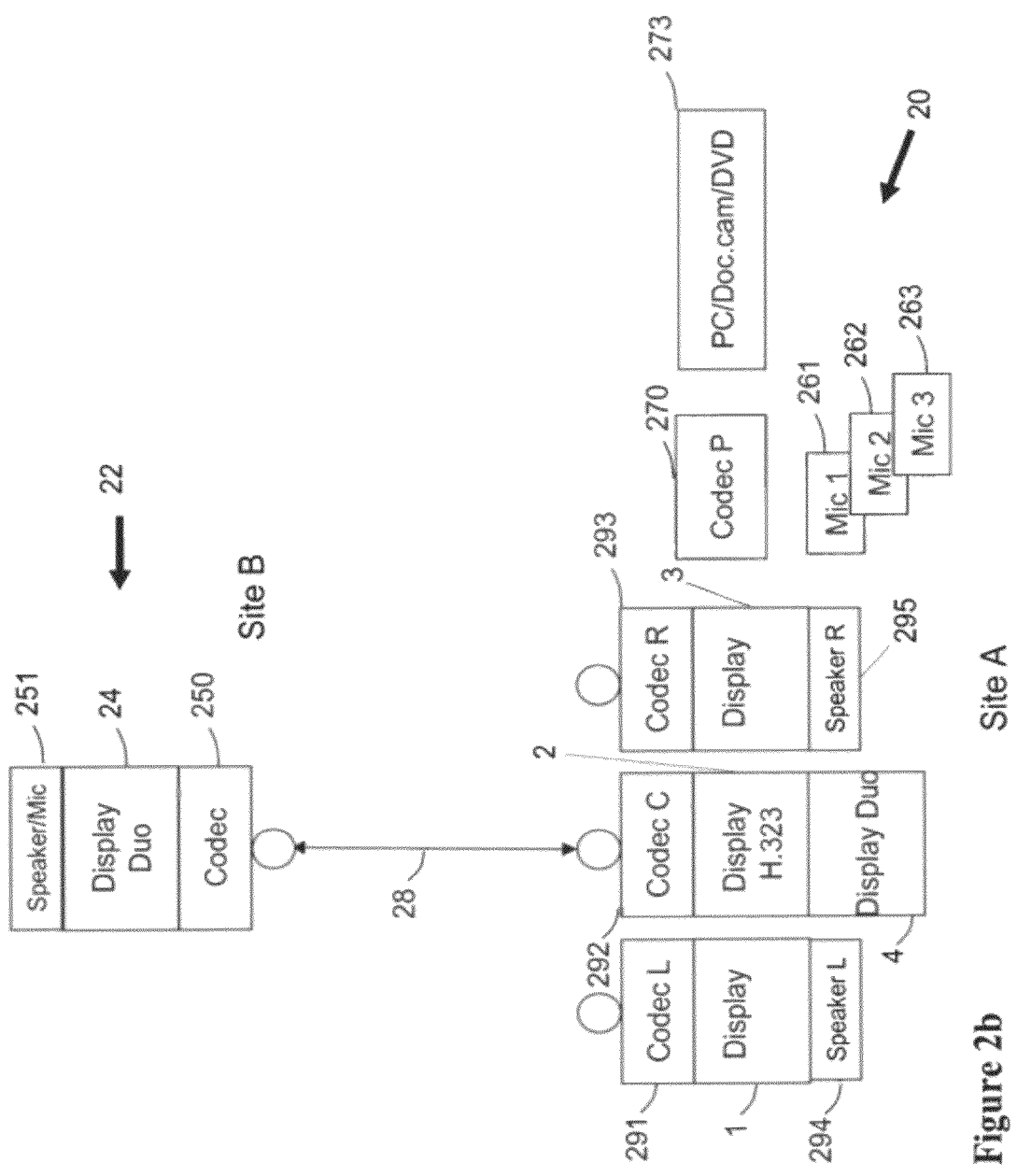

In more detail, the system in FIG. 2b shows that there are three codecs 291, 292 and 293 in the telepresence system 20. However in this mode of operation, only the codec C, 292, connects with codec 250 of the remote site 22. The connection may be made by way of a publicly accessible network 28, a hybrid network (partly public and partly private) or a dedicated network. Codec C, 292 provides an image on display 2 of the participants at the remote site 22. Display duo 4 may display the computer generated graphics of the computer 26 (FIG. 2a). Codecs 291, 293 and displays 1 and 3 are not used in this mode of operation.

Alternatively, displays 1 and 3 may display static or dynamic images of a conference room setting to give the impression that the participants at site B are actually located in a larger facility than they may be. Likewise speakers 294 and 295 are not used in this setting. A central speaker (not shown) may present the audio, or alternatively a combination of the left and right speakers 294 and 295 may be used to present the audio from the remote site 22. By capturing audio from each of the different microphones 261-263, directionality of the location of the speaker's direction may be replicated by mixing appropriate audio levels in the left and right speakers for example. Microphones 261, 262 and 263 capture audio from the participants at site A, 20. Auxiliary devices such as a personal computer, document camera or DVD, 273 connect to the master codec P 270, which controls operation, and may send alternative data to the remote site 22 for display on the display duo 24 or present it in audio through the speakers.

As depicted in FIG. 2b, the mid-codec (Codec C 292) of the telepresence system in site A 20 is connected to the codec 250 of the conventional video conference system of site B 22 (alternatively, codec P could be connected to the conventional video conference system instead). The internal multi-site software or an external videoconferencing bridge can be used with this system and all the standard videoconferencing features would apply, such as split screen or voice switched operation. Duo video also functions as if the telepresence system were configured as a standard videoconferencing unit, displaying the presentation source material at all sites regardless of whether the transmission of this material is from a local or remote site. In this mode of operation, only one of the central cameras and one codec is utilized to keep within the ITU standards for inter-connection.

Figure 3A:
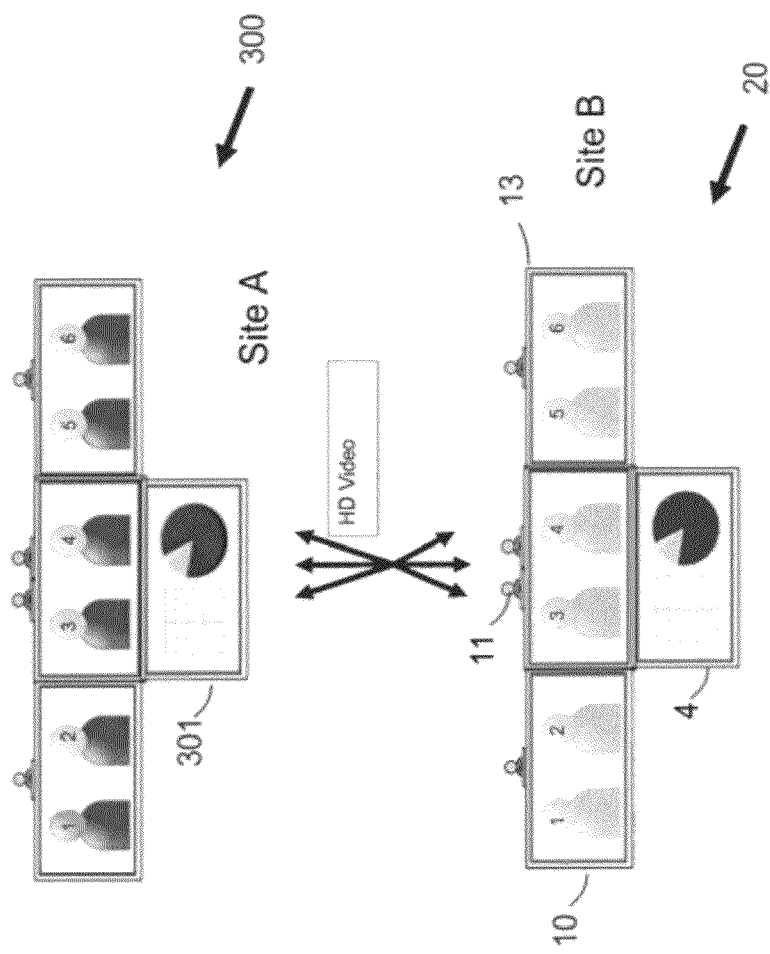
FIGS. 3a and 3b are illustrations of a connection mode between two telepresence systems according to the present invention.

A second mode between two telepresence sites is depicted in FIG. 3a. During a Point-to-Point Telepresence call, three of the cameras, left 10, center 11, and right 13, are used to pass preferably high definition 720P images (although 1080i or 1080p may also be used) between the two locations to provide life-size high quality images of up to six participants at each of the location. As can be seen, when presentation materials (see display 4) are transmitted between the two sites (20 and 300) the lower plasma screen (4 and 301) is used to display this information. When the presentation is de-activated, the lower screen displays no image. The connection between the codecs in this constellation is shown in FIG. 3b.

Figure 3B:
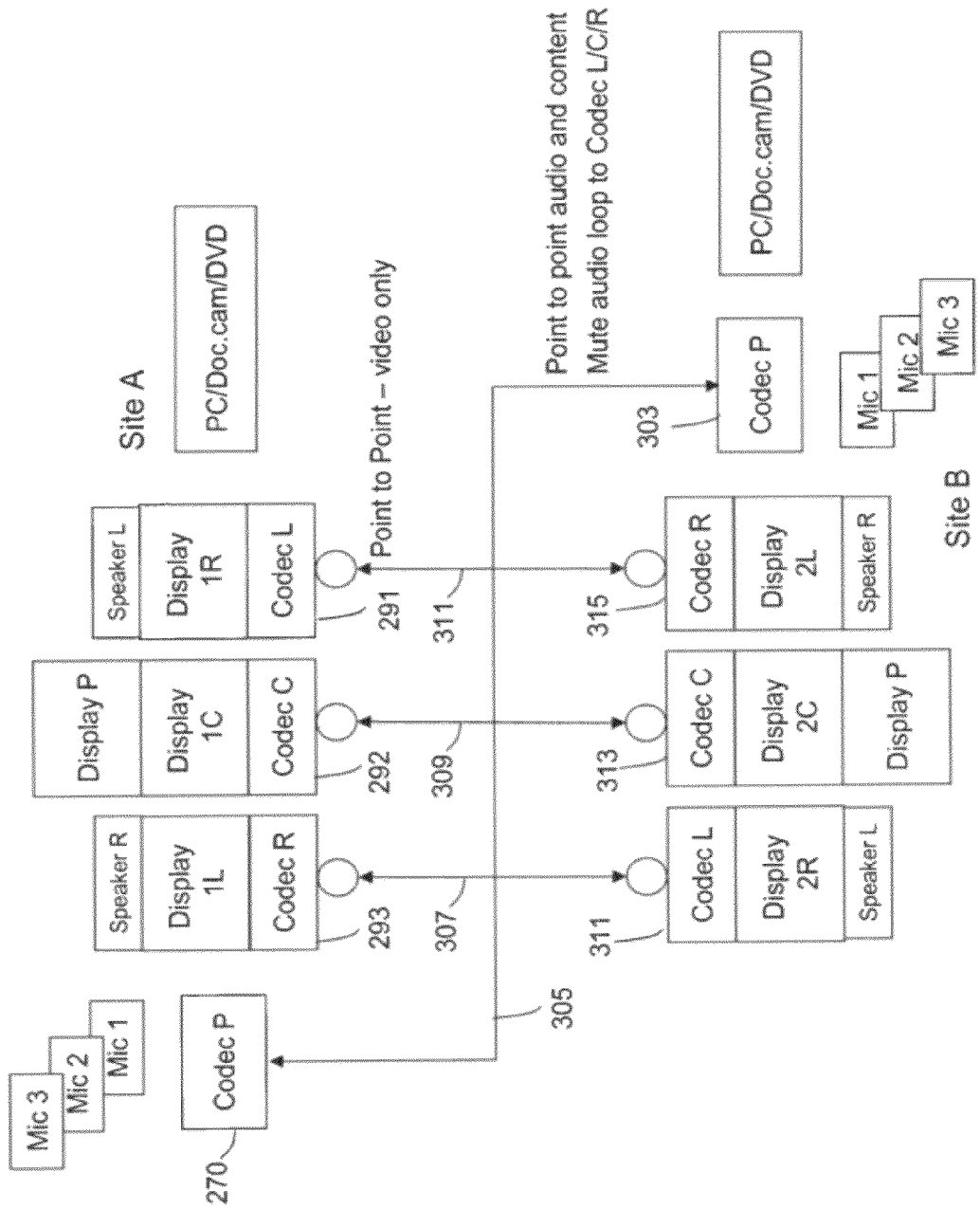

The connections in FIG. 3b are similar to those in FIG. 2b, except once the master codec 270 establishes the call to master codec 303, the two master codecs respectively establish communication links between the respective codecs as shown in FIG. 3b. Moreover, when the IP connection is made over IP network 305, perhaps through respective firewalls located at site A and/or site B, the master codec 270 informs codec 303 of the addresses for codecs 293, 292 and 291. Then corresponding codecs 311, 313 and 315, establish point-to-point video connections with corresponding codes at site A. Moreover, the codec L 311 establishes a point-to-point connection with codec R 393 at site A, in much the same "mirror image" way that two individuals would sit across the table from one another. Likewise, center codecs 313 and 292 establish a connection and codecs 315 and 391 establish a connection. The point-to-point connections are made over connections 307, 309 and 311 and such connections may be virtual channels over an IP network, or even dedicated transmission lines.

Figure 4A:
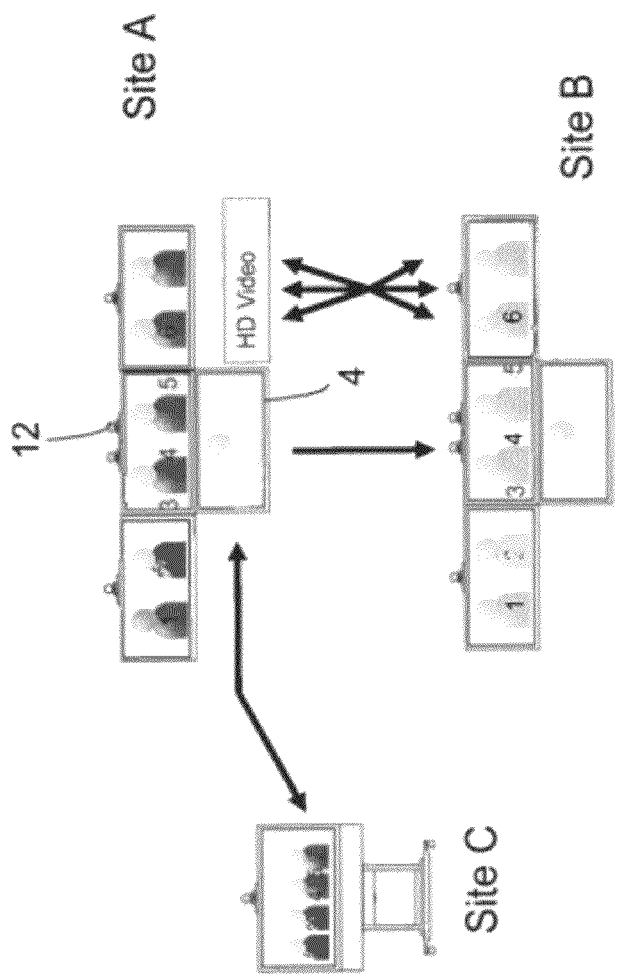
FIGS. 4a and 4b illustrate a connection mode between two telepresence systems and a conventional video conference endpoint according to the present invention.

A third mode between two telepresence sites in addition to a conventional video conference site is depicted in FIG. 4a. Once a telepresence call has been established, there may be occasions when an external site with a conventional video conference system is required to be added into the meeting. The call to this site can be achieved through a variety of ways, but is normally added by using a control touchpanel on the main codec, or via a remote control that controls the system 22. Once a call has been established, the fourth central camera 12 is now used to transmit a live image of the central four conference participants for one of the telepresence sites. Any more would likely to be impracticable as the remote screen could be very small, such as used for a desktop system. Both of the telepresence sites still see a life size image of each other, with the incoming image of the external site being shown on the lower plasma display 4. The image displayed at the external site is automatically changed from one telepresence site to the second depending upon who is speaking, but both telepresence sites will always view the external site. Regardless of the origination site, when a presentation is selected, the external site will operate according to the type of system being used. If it is capable of displaying two images at once, in a side to side or PIP (Picture In Picture) mode then the selected rule will apply.

The telepresence systems will automatically display the presentation material on the lower display 4 replacing the main image from the external site. When the presentation is turned off, then the system will revert to displaying the external site image.

As an alternative, the telepresence systems can display the presentation material in a side-by-side mode along with the external site participant. When the presentation is switched off, the system will revert to displaying the main image from the external site.

Figure 4B:
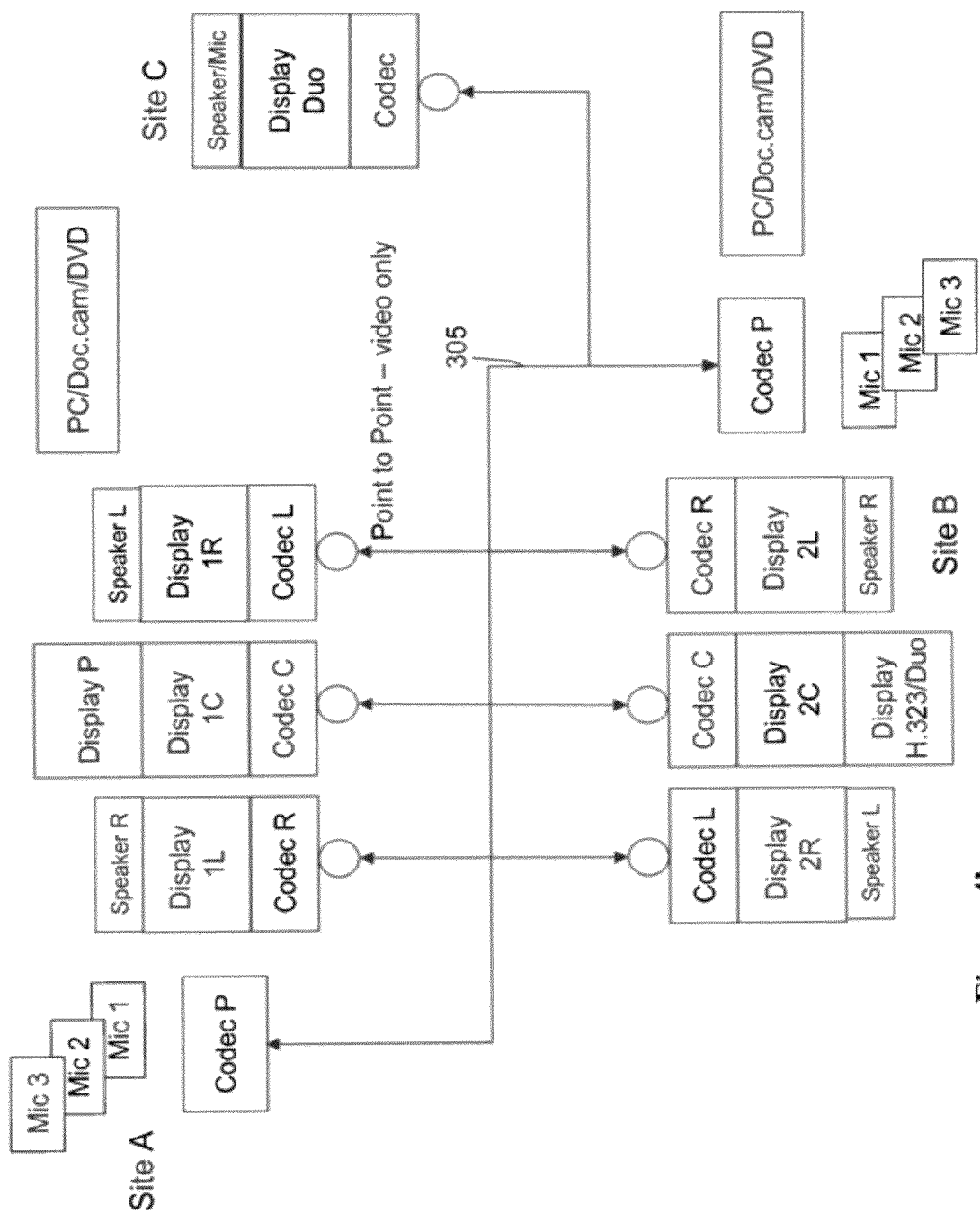

FIG. 4b shows the connection between the codecs in this third mode constellation through the network connection 305. Note that it is the third codec of the respective telepresence systems that is connected to the conventional video conference system.

Figure 5A:
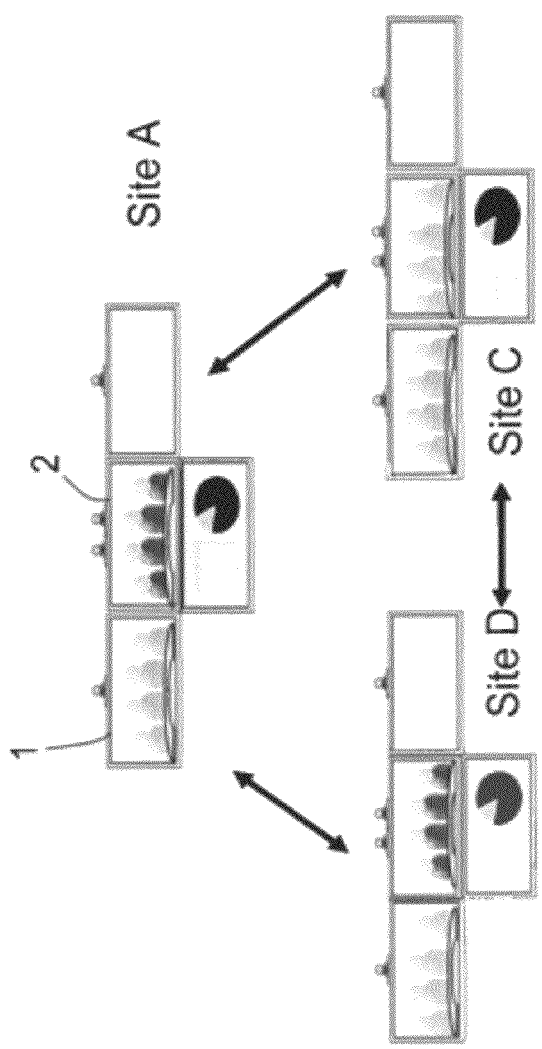
FIGS. 5a and 5b illustrate a connection mode between three telepresence systems according to the present invention.

A fourth mode of operation is shown in FIG. 5a between three telepresence sites in a multi-site telepresence conference. A three site telepresence mode utilizes two of the main displays (e.g. 1 and 2) for the remote sites, with the lower display 4 being used for presentation materials. In this mode of operation, the two cameras associated with the main display screens being automatically re-positioned to give a view of the central four participants at each site. The repositioning is done by way of the processor in the codec, for example, or another processor, recognizing that the fourth mode of operation has been invoked so as to steer the cameras to the central four participants. By using the two cameras, sending one signal to one of the sites and a second signal to the other site, provides a "turn-to" feeling in that users at the different sites will recognize that the participants at the other sites are turned toward them, thus providing a more realistic view and telepresence perception.

Figure 5B:
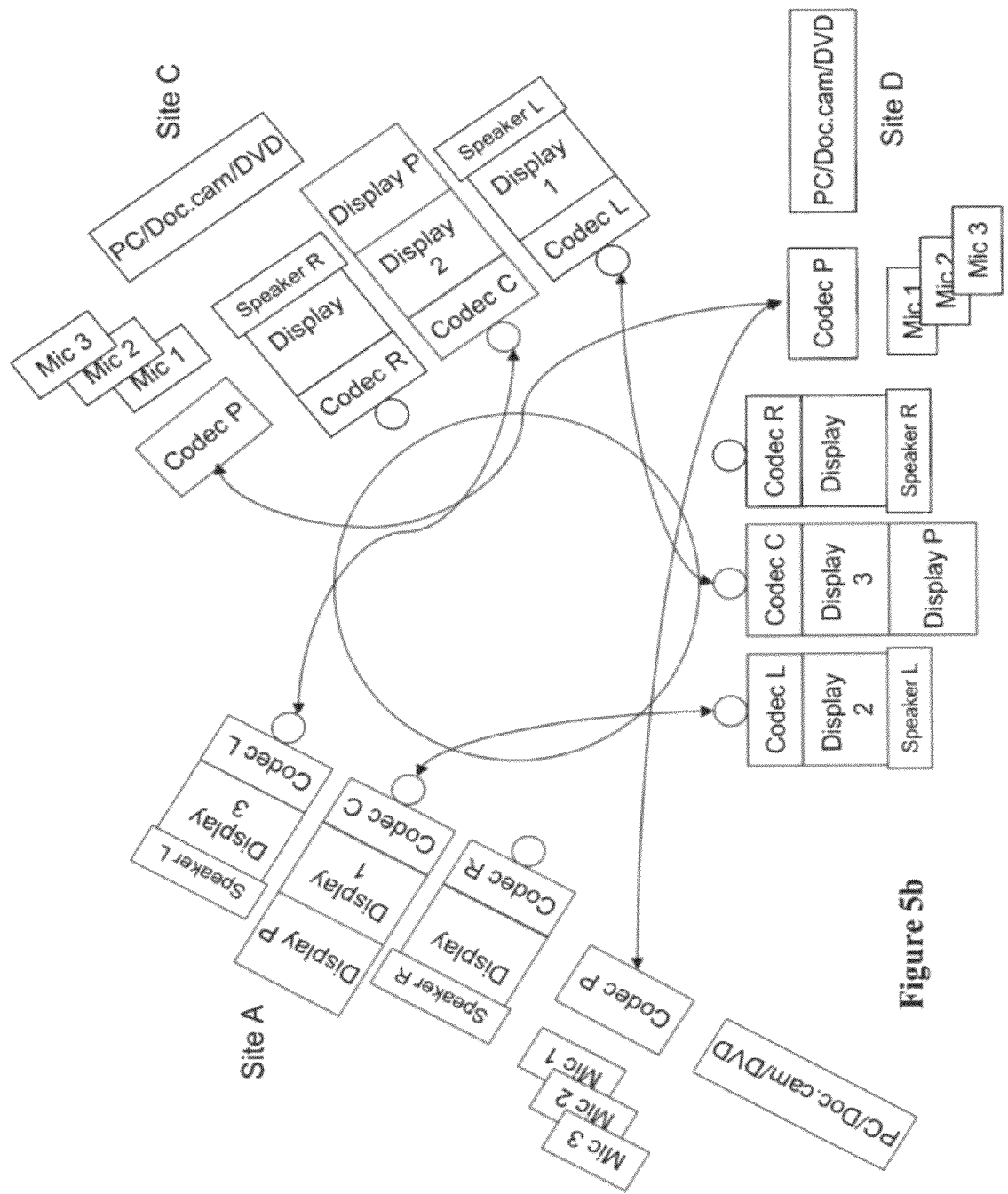

FIG. 5b shows the connection between the codecs in this fourth mode constellation. Note how the codecs are connected (right to left and left to right) to provide the turn-to feeling mentioned above. Left and center codecs, for example, are used to establish connections to the different sites, thus providing the impression that the users at each of the respective sites are turned to one another.

Figure 6A:
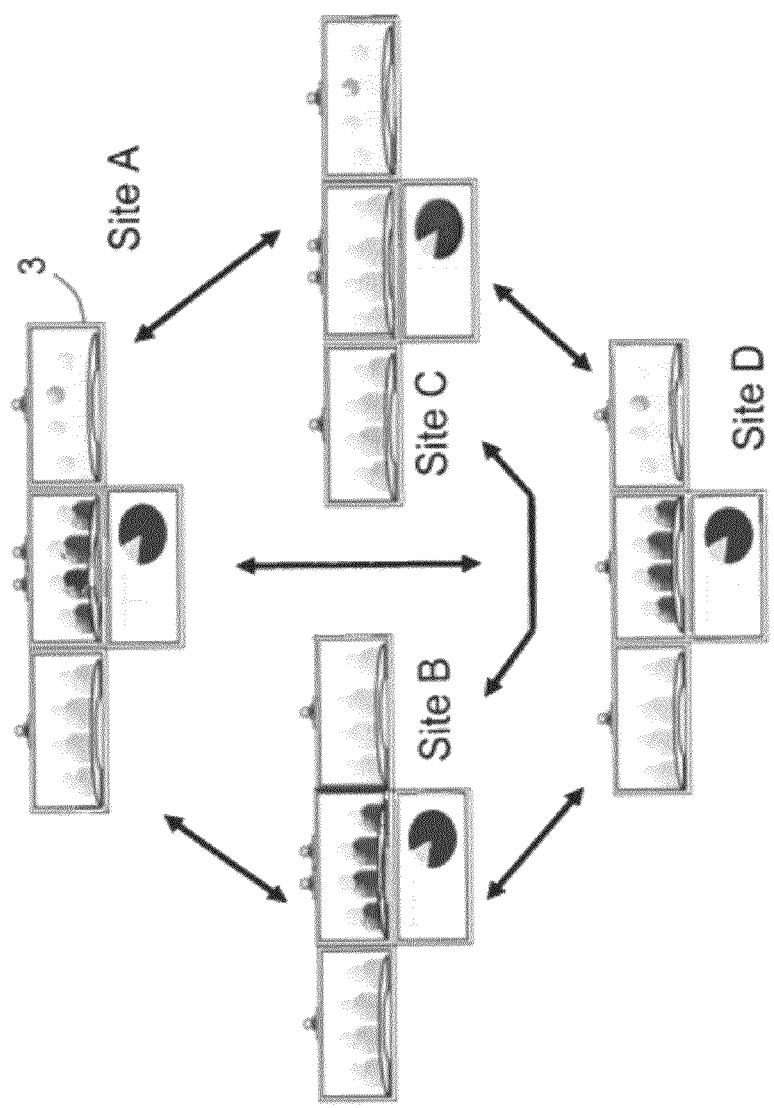
FIGS. 6a and 6b illustrate a connection mode between four telepresence systems according to the present invention.
Figure 6B:
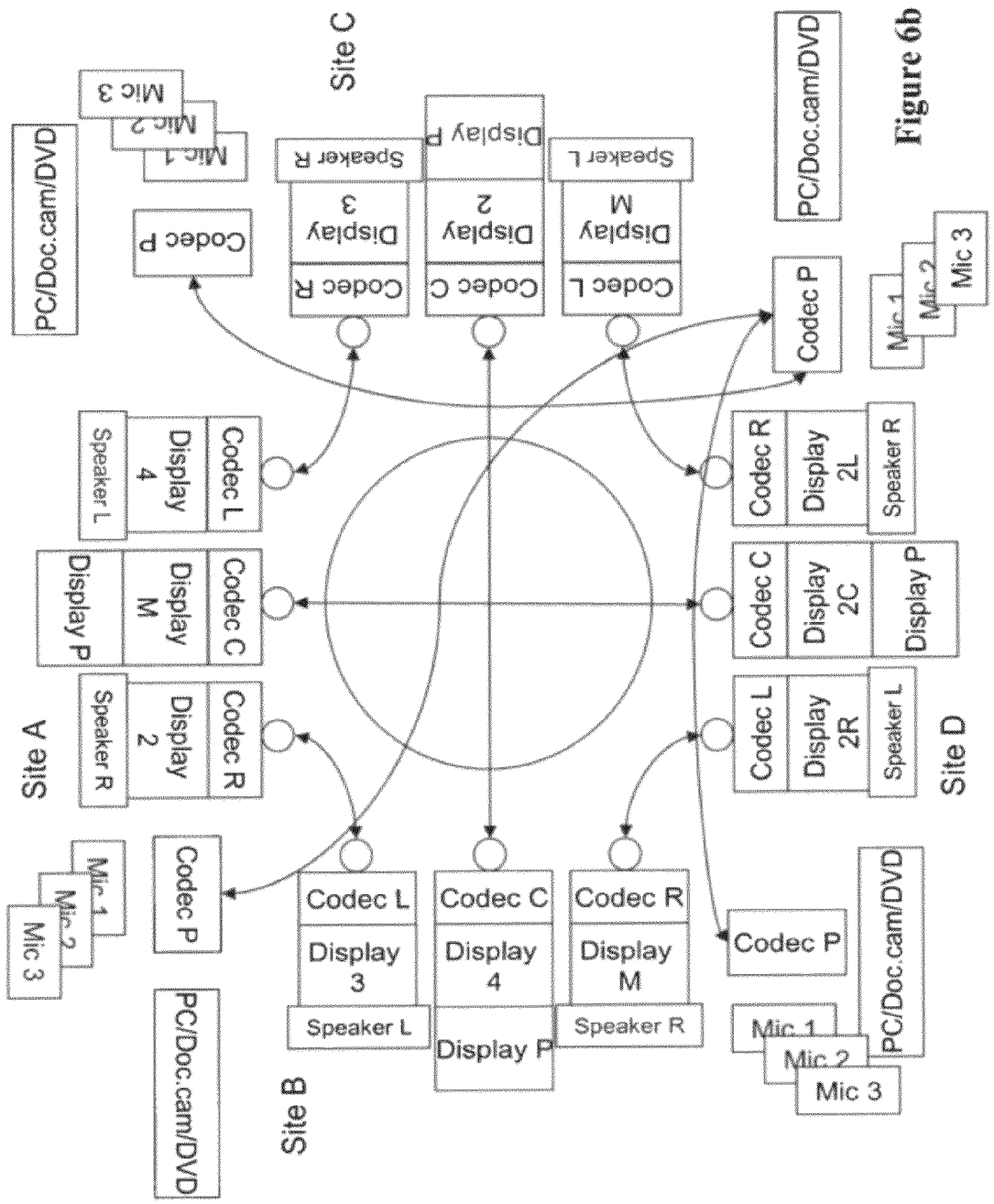

A fifth mode of operation between four telepresence sites in a multi-site telepresence conference is depicted in FIG. 6a. In this mode, the system operates in a similar mode as the fourth, but utilizing the third main display screen 3, allowing all four sites to see each of the other three sites simultaneously. This is enabled by a mid-to-mid and left to right constellation of codec connections as shown in FIG. 6b. Note that it is only the fourth codec (Codec P) of the master site that is connected to all the other sites, so as to control the establishment of the connections between the codec pairs.

In either a three or four site Telepresence Multi-Site mode, when a presentation is selected from any of the sites, the lower screen on every site will display the image regardless of which site the information was transmitted from. Similarly, when an external site with a conventional video conference system is added to the conference, the same rules apply as outlined above; the external site will see whoever is speaking at a telepresence site, and the external site will be shown on the lower display either individually or side by side with a presentation, depending upon user preference.

Figure 7:
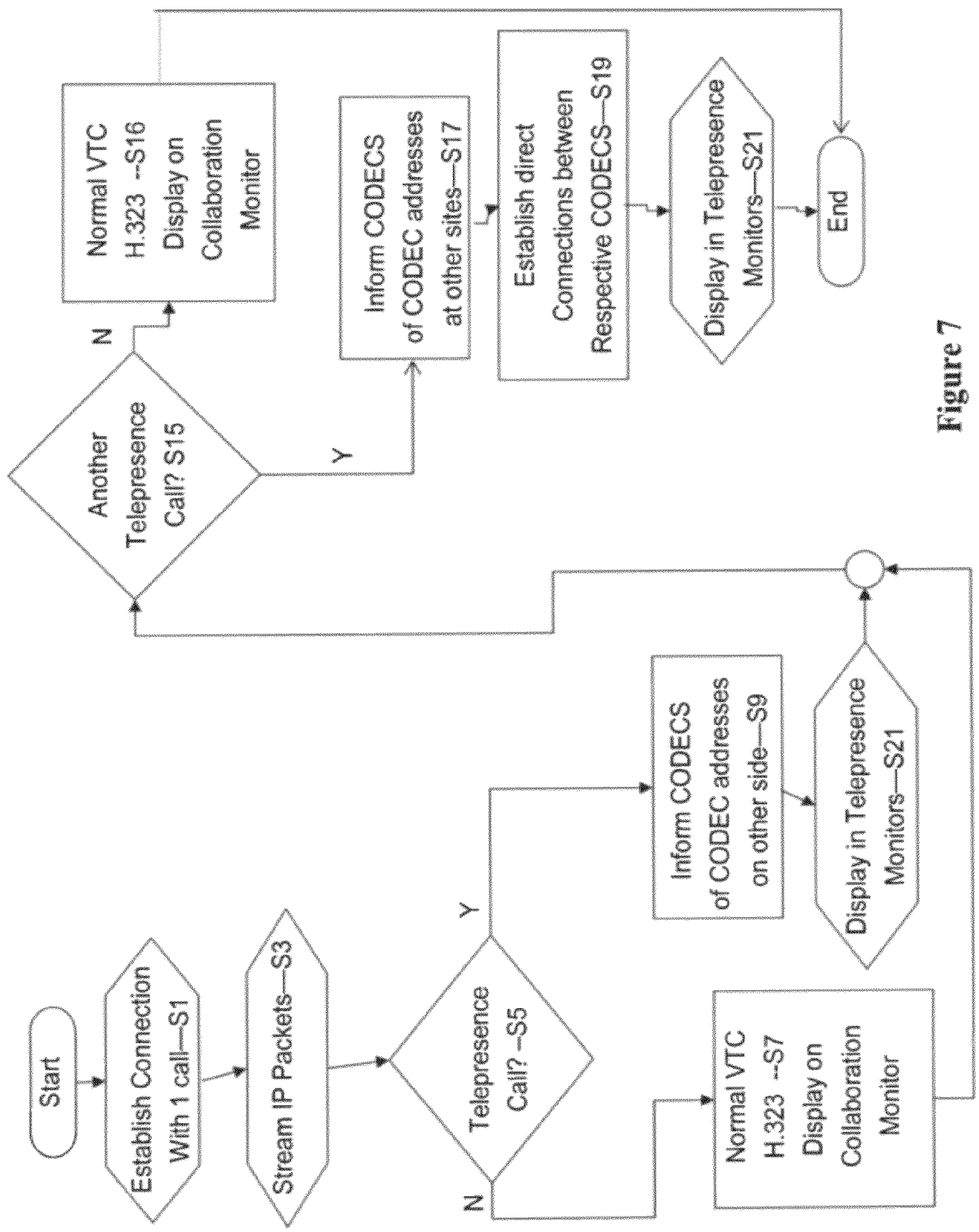
FIG. 7 is a flow chart showing a flow control for establishing connections between a calling telepresence system and at least one of a conventional video teleconference system and another telepresence system according to the present invention.

FIG. 7 shows a flow chart describing the process steps for establishing connections between the calling telepresence site and another site. The process begins in step S1 with a master codec (the codec could be part of a transceiver or separate therefrom) of a calling telepresence system making a call to another system. The process then proceeds to step S3 where a stream of IP packets is sent to a destination terminal, where at least one of the IP packets indicates that the call is a telepresence call. The process then proceeds to step S5 where a query is made at the called codec, determining whether the call is a telepresence call. If the response to the inquiry is negative, then a normal video teleconference call is made, such as using a H.323 connection, and a display is made on the duo video screen 4 as shown in FIG. 1. However, if the response to the inquiry in step S5 is affirmative, the process proceeds to step S9 where the master codec of the calling telepresence terminal informs the master codec of the called telepresence terminal of the addresses of the codecs at the calling side. (On the other hand, the called terminal may inform the calling terminal of the addresses of the three codecs). The process then proceeds to step S21 where connections are made between the respective codecs and between one and three simultaneous displays made depending on whether one or three codecs are used for providing a telepresence display. The process then proceeds to step S15, where a query is made to determine whether another telepresence call is made. If the response to the query is negative, the process proceeds to step S16 where a continuous presence display is made on the screen 4 if multiple video teleconference terminals using conventional VTC signaling are included in the telepresence call. Alternatively if the response to the inquiry in step S15 is affirmative, additional codecs inform one another of their respective addresses so as to establish direct connections between the respective codecs in step S19 and a telepresence of the respective multisites are displayed in step S21 (such as that shown in FIG. 5a for example). Subsequently the process ends.

A controller, processor for a master codec, or remote control of the present invention may be implemented with the system shown in FIG. 2, and corresponding description contained in commonly owned U.S. Pat. No. 7,295,613, the entire contents of which being incorporated herein by reference.

Numerous modifications and variations of the present invention are possible in light of the above teachings. It is therefore to be understood that within the scope of the appended claims, the invention may be practiced otherwise than as specifically described herein.

The invention claimed is:

1. A local multiscreen telepresence system at a local site configured to communicate with at least a remote multiscreen telepresence system at a remote site, said local multiscreen telepresence system comprising:
   a first high definition display screen configured to display a first remote video image at said remote site, said first remote video image being of a left-hand portion of the remote site;
   a first video camera positioned to capture an image of a right-hand portion of the local site;
   a first transceiver configured to send a first local video image from the first video camera to a corresponding transceiver at the remote site for display on a first remote display;
   a second high definition display screen configured to display a second remote video image at said remote site, said second remote video image being of a right-hand portion of the remote site;
   a second video camera positioned to capture an image of a left-hand portion of the local site; and
   a second transceiver configured to send a second video image from the second video camera to a corresponding transceiver at the remote site for display on a second remote display, wherein
   a first angle of view from the right-hand side of the local site to the first high definition display screen and a first angle of incidence from the right-hand side of the local site to the first video camera being approximately equal,
   a second angle of view from the left-hand side of the local site to the second high definition display screen and a second predetermined angle of incidence from the second video camera being approximately equal,
   said left-hand side and said right-hand side being with respect to a direction facing respective display surfaces of said first and second high definition display screens, and
   said first high definition display screen being positioned on a right side of said second high definition display screen at said local site,
   wherein a telepresence conference is initiated from only one of the first transceiver and the second transceiver to the remote multiscreen telepresence system with one telepresence call that includes an IP packet with a TPX message informing the remote multiscreen telepresence system of one or more addresses of respective codecs at the local multiscreen telepresence system.

2. The multiscreen telepresence system of claim 1, wherein said first transceiver and said second transceiver are codecs.

3. The multiscreen telepresence system of claim 1, wherein said first display screen being at least one of a 720 p and 1080 p format.

4. The multiscreen telepresence system of claim 1, wherein said first camera being positioned at a top center portion of said first display screen, and
said second camera being positioned at a top center portion of said second display screen.

5. The multiscreen telepresence system of claim 1, further comprising:
   a third transceiver configured to send video images from a third camera disposed on a third display screen to said remote site, and said third transceiver configured to receive a video stream from a corresponding third transceiver at the remote site and provide an image on said third display of a center portion of said remote site,
   said third display screen being positioned between said second and third display screens, and
   said third camera being positioned between said first and second cameras.

6. The multiscreen telepresence system of claim 5, wherein said first display screen, said second and said third display images from different respective remote sites,
   said first camera is configured to capture an image of the local site from a perspective of a leftmost display, and said first transceiver sends a corresponding video image to a first remote site for display on a rightmost display;
   said second camera is configured to capture an image of the local site from a perspective of a rightmost display, and said second transceiver sends a corresponding video image to a second remote site for display on a leftmost display; and
   said third camera is configured to capture an image of the local site from a perspective of a center display, and said third transceiver sends a corresponding video image to a third remote site for display on a center display.

7. The multiscreen telepresence system of claim 1, further comprising:
   a fourth display disposed below said third display and configured to display at least one of presentation data, and an image from a video conference endpoint that is not compatible with telepresence presentation.

8. A method for providing a telepresence conference between local multiscreen telepresence system and at least a remote multiscreen telepresence system at a remote site, comprising steps of:
   displaying on a first high definition display screen a first remote video image at said remote site, said first remote video image being of a left-hand portion of the remote site;
   capturing with a first video camera an image of a right-hand portion of the local site;
   sending from a first transceiver a first local video image from the first video camera to a corresponding transceiver at the remote site for display on a first remote display;

displaying on a second high definition display screen a second remote video image at said remote site, said second remote video image being of a right-hand portion of the remote site;

capturing with a second video camera a left-hand portion of the local site; and sending from a second transceiver a second video image from the second video camera to a corresponding transceiver at the remote site for display on a second remote display, wherein a first angle of view from the right-hand side of the local site to the first high definition display screen and a first angle of incidence from the right-hand side of the local site to the first video camera being approximately equal, a second angle of view from the left-hand side of the local site to the second high definition display screen and a second predetermined angle of incidence from the second video camera being approximately equal, said left-hand side and said right-hand side being with respect to a direction facing respective display surfaces of said first and second high definition display screens, and said first high definition display screen being positioned on a right side of said second high definition display screen at said local site, wherein a telepresence conference is initiated from only one of the first transceiver and the second transceiver to the remote multiscreen telepresence system with one telepresence call that includes an IP packet with a TPX message informing the remote multiscreen telepresence system of one or more addresses of respective codecs at the local multiscreen telepresence system.

9. The method of claim 8, wherein
said first transceiver and said second transceiver are codecs.

10. The method of claim 8, wherein
said first camera being positioned at a top center portion of said first display screen, and
said second camera being positioned at a top center portion of said second display screen.

11. The method of claim 8, further comprising:
displaying on a third high definition display screen a third remote video image at said remote site, said third remote video image being of a center portion of the remote site;
capturing with a third video camera the center portion of the local site; and
sending from a third transceiver a third video image from the third video camera to a corresponding transceiver at the remote site for display on a third remote display,
said third display being positioned between said second and third displays, and
said third camera being positioned between said first and second cameras.

12. The method of claim 11, wherein
each of said first display screen, said second display screen, and said third display screen an image from a different respective remote site,
said first camera is configured to capture an image of the local site from a perspective of a leftmost display, and said first transceiver sends a corresponding video image to a first remote site for display on a rightmost display;
said second camera is configured to capture an image of the local site from a perspective of a rightmost display, and said second transceiver sends a corresponding video image to a second remote site for display on a leftmost display; and said third camera is configured to capture an image of the local site from a perspective of a center display, and said third transceiver sends a corresponding video image to a third remote site for display on a center display.

13. The method of claim 12, further comprising:
displaying on a fourth display disposed below said third display at least one of presentation data, and an image from a video conference endpoint that is not compatible with telepresence presentation.

14. A non-transitory computer readable medium having computer readable instructions that when executed by a processor perform a method for providing a telepresence conference between local multiscreen telepresence system and at least a remote multiscreen telepresence system at a remote site, said method comprising steps of:
displaying on a first high definition display screen a first remote video image at said remote site, said first remote video image being of a left-hand portion of the remote site;
capturing with a first video camera an image of a right-hand portion of the local site;
sending from a first transceiver a first local video image from the first video camera to a corresponding transceiver at the remote site for display on a first remote display;
displaying on a second high definition display screen a second remote video image at said remote site, said second remote video image being of a right-hand portion of the remote site;
capturing with a second video camera a left-hand portion of the local site; and
sending from a second transceiver a second video image from the second video camera to a corresponding transceiver at the remote site for display on a second remote display, wherein
a first angle of view from the right-hand side of the local site to the first high definition display screen and a first angle of incidence from the right-hand side of the local site to the first video camera being approximately equal,
a second angle of view from the left-hand side of the local site to the second high definition display screen and a second predetermined angle of incidence from the second video camera being approximately equal,
said left-hand side and said right-hand side being with respect to a direction facing respective display surfaces of said first and second high definition display screens, and
said first high definition display screen being positioned on a right side of said second high definition display screen at said local site,
wherein a telepresence conference is initiated from only one of the first transceiver and the second transceiver to the remote multiscreen telepresence system with one telepresence call that includes an IP packet with a TPX message informing the remote multiscreen telepresence system of one or more addresses of respective codecs at the local multiscreen telepresence system.

15. A multiscreen telepresence system comprising:
a controller;
a plurality of local transceivers having respective addresses and controlled by said controller, said controller configured to initiate a telepresence call with a remote multiscreen telepresence system at a remote site over a communication network, said telepresence call including an indication in a calling signal that the call is a telepresence call that informs the remote site of addresses of the local transceivers, wherein said plurality of local transceivers including a first local transceiver associated with a first high definition display screen and a first camera, and configured to communicate in a point-to-point connection with a corresponding first remote transceiver at said remote site after said telepresence call has been established, said plurality of local transceivers including a second transceiver associated with a second display and a second camera, and configured to communicate in a point-to-point connection with a corresponding second remote transceiver at said remote site, wherein said first local transceiver being configured to receive an incoming first video stream from said first remote transceiver of a first portion of said remote site and display a corresponding image on said first display, said corresponding image being captured by a first camera at said remote site, said second local transceiver being configured to receive an incoming second video stream from said second remote transceiver of a second portion of said remote site and display a corresponding image on said second display, said corresponding image being captured by a second camera at said remote site, said first image being different than said second image, at least a portion of said network including traffic from equipment other than that used for said telepresence call, wherein a telepresence conference is initiated from only one of the first transceiver and the second transceiver to the remote multiscreen telepresence system with one telepresence call that includes an IP packet with a TPX message informing the remote multiscreen telepresence system of one or more addresses of respective codecs at the local multiscreen telepresence system.

16. The multiscreen telepresence system of claim 15, wherein
said plurality of local transceivers are codecs.

17. The multiscreen telepresence system of claim 15, wherein
said first display being disposed on a right-side of said second display at a local site,
said first portion of said remote site being a left-hand side of said remote site, and
said second portion of said remote site being a right-hand side of said remote site.

18. The multiscreen telepresence system of claim 15, wherein
said first camera being positioned at a top center portion of said first display, and
said second camera being positioned at a top center portion of said second display.

19. The multiscreen telepresence system of claim 15, further comprising:
a third transceiver configured to send video images from a third camera disposed on a third display to said remote site, and said third transceiver configured to receive a video stream from a corresponding third transceiver at the remote site and provide an image on said third display of a center portion of said remote site,
said third display being positioned between said second and third displays, and
said third camera being positioned between said first and second cameras.

20. The multiscreen telepresence system of claim 19, wherein
each of said first camera, said second camera and said third camera capture an image from a different remote site,
said first camera is configured to capture an image of the local site from a perspective of a leftmost display, and said first transceiver sends a corresponding video image to a first remote site for display on a rightmost display;
said second camera is configured to capture an image of the local site from a perspective of a rightmost display, and said second transceiver sends a corresponding video image to a second remote site for display on a leftmost display; and
said third camera is configured to capture an image of the local site from a perspective of a center display, and said third transceiver sends a corresponding video image to a third remote site for display on a center display.

21. The multiscreen telepresence system of claim 15, further comprising:
a fourth display disposed below said third display and configured to display at least one of presentation data, and an image from a video conference endpoint that is not compatible with telepresence presentation.

22. A method for establishing communications in a telepresence system comprising steps of:
initiating from a controller a single call with a remote multiscreen telepresence system at a remote site over a non-dedicated communication network, said initiating step including forming a calling signal with an indication that the call is a telepresence call that informs the remote site of addresses of local transceivers;
receiving said calling signal at said remote site;
replying from said remote site with point to point connections between respective transceivers at a local site and said remote site, said respective transceivers including
a first local transceiver associated with a first high definition display screen and a first camera,
a second transceiver associated with a second display and a second camera,
receiving an incoming first video stream at said first local transceiver from said first remote transceiver of a first portion of said remote site and displaying a corresponding image on a first display, said corresponding image being captured by a first camera at said remote site,
receiving an incoming second video stream at said second local transceiver from said second remote transceiver of a second portion of said remote site and displaying a corresponding image on a second display, said corresponding image being captured by a second camera at said remote site,
said first image being different than said second image,
at least a portion of said network including traffic other than for said telepresence call,
wherein a telepresence conference is initiated from only one of the first transceiver and the second transceiver to the remote multiscreen telepresence system with one telepresence call that includes an IP packet with a TPX message informing the remote multiscreen telepresence system of one or more addresses of respective codecs at the local multiscreen telepresence system.

23. The method of claim 22, wherein
said respective transceivers at said local site are codecs.

24. The method of claim 22, wherein
said first display screen being disposed on a right-side of said second display screen at the local site,
said first portion of said remote site being a left-hand side of said remote site, and
said second portion of said remote site being a right-hand side of said remote site.

25. The method of claim 22, wherein
said first camera being positioned at a top center portion of said first display screen, and
said second camera being positioned at a top center portion of said second display screen.

26. The method of claim 22, further comprising:
receiving an incoming third video stream at a third transceiver from a third remote transceiver of a third portion of said remote site, and
displaying a corresponding image on a third display, said corresponding image being captured by a third camera at said remote site,
said third display being positioned between said second and third displays, and
said third camera being positioned between said first and second cameras.

27. The method of claim 26, wherein
each of said first display screen, said second display screen and said third display screen display images from different respective remote sites,
said first camera is configured to capture an image of the local site from a perspective of a leftmost display, and said first transceiver sends a corresponding video image to a first remote site for display on a rightmost display;
said second camera is configured to capture an image of the local site from a perspective of a rightmost display, and said second transceiver sends a corresponding video image to a second remote site for display on a leftmost display; and
said third camera is configured to capture an image of the local site from a perspective of a center display, and said third transceiver sends a corresponding video image to a third remote site for display on a center display.

28. The method of claim 27, further comprising:
displaying on a fourth display disposed below said third display at least one of presentation data, and an image from a video conference endpoint that is not compatible with telepresence presentation.

29. A non-transitory computer readable medium having computer readable instructions that when executed by a processor perform a method for establishing communications in a telepresence system comprising steps of:
initiating from a controller a single call with a remote multiscreen telepresence system at a remote site over a non-dedicated communication network, said initiating step including forming a calling signal with an indication that the call is a telepresence call that informs the remote site of addresses of local transceivers;
receiving said calling signal at said remote site;
replying from said remote site with point to point connections between respective transceivers at a local site and said remote site, said respective transceivers including
a first local transceiver associated with a first high definition display screen and a first camera,
a second transceiver associated with a second display and a second camera,
receiving an incoming first video stream at said first local transceiver from said first remote transceiver of a first portion of said remote site and displaying a corresponding image on a first display, said corresponding image being captured by a first camera at said remote site,
receiving an incoming second video stream at said second local transceiver from said second remote transceiver of a second portion of said remote site and displaying a corresponding image on a second display, said corresponding image being captured by a second camera at said remote site,
said first image being different than said second image,
at least a portion of said network including traffic other than for said telepresence call,
wherein a telepresence conference is initiated from only one of the first transceiver and the second transceiver to the remote multiscreen telepresence system with one telepresence call that includes an IP packet with a TPX message informing the remote multiscreen telepresence system of one or more addresses of respective codecs at the local multiscreen telepresence system.

* * * * *